(12) United States Patent
Sekiya et al.

(10) Patent No.: US 8,666,600 B2
(45) Date of Patent: Mar. 4, 2014

(54) REAR TOE CONTROL SYSTEM AND METHOD

(75) Inventors: Shigenobu Sekiya, Dublin, OH (US); David A. Thompson, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/528,383

(22) Filed: Jun. 20, 2012

(65) Prior Publication Data
US 2013/0345934 A1 Dec. 26, 2013

(51) Int. Cl.
*G06F 7/00* (2006.01)

(52) U.S. Cl.
USPC ............ 701/41; 180/408; 180/409; 180/410; 180/412; 180/415; 180/443; 180/445; 180/446

(58) Field of Classification Search
USPC ............ 701/41; 180/408, 409, 410, 412, 415, 180/443, 445, 446
See application file for complete search history.

(56) References Cited

U.S. PATENT DOCUMENTS

| 4,191,274 A | 3/1980 | Goldberg et al. |
| 4,740,002 A | 4/1988 | Miyoshi |
| 5,295,550 A | 3/1994 | Chikuma |
| 7,873,440 B2 * | 1/2011 | Horiuchi et al. ............... 700/279 |
| 2008/0243339 A1 * | 10/2008 | Nishimori et al. ............... 701/41 |
| 2009/0177348 A1 * | 7/2009 | Yanagi ............................. 701/29 |
| 2010/0191405 A1 | 7/2010 | Sugitani et al. |
| 2011/0046851 A1 * | 2/2011 | Onaya et al. ..................... 701/41 |
| 2012/0253608 A1 * | 10/2012 | Aoki et al. ....................... 701/49 |

FOREIGN PATENT DOCUMENTS

| EP | 2236393 | 10/2010 | |
| JP | 2009-235925 A | * 10/2009 | .............. B62D 7/14 |
| JP | 2009235925 | 10/2009 | |

OTHER PUBLICATIONS

International Search Report and Written Opinion of PCT/US2013/038636 dated Aug. 16, 2013.

* cited by examiner

*Primary Examiner* — Mary Cheung
*Assistant Examiner* — Brian P Sweeney
(74) *Attorney, Agent, or Firm* — Rankin, Hill & Clark LLP

(57) ABSTRACT

A rear toe control (RTC) system and method for a vehicle includes rear actuators for applying rear steering to rear wheels of the vehicle and rear sensors for measuring individual toe angles of the rear wheels. The system further includes a RTC failure module that determines when the RTC system has failed and a road condition determining module that determines whether the vehicle is encountering a poor road surface condition. An electronic control unit (ECU) is disposed on the vehicle and is configured to impose a speed limit for the vehicle when the RTC failure module determines that the RTC system has failed and the road condition determining module determines that the vehicle encountering a poor road surface condition.

20 Claims, 3 Drawing Sheets

REAR TOE CONTROL SYSTEM AND METHOD

BACKGROUND

The present invention generally relates to a rear toe control system and method, and more particularly relates to a rear toe control system and method that imposes a speed limit on a vehicle during failure of the rear toe control system.

A rear toe control (RTC) system is known that can individually vary the toe angles of the right and left rear wheels on a vehicle. In particular, the toe-in and toe-out of the rear wheels can be freely controlled when desired by simultaneously actuating right and left actuators in a symmetric manner. If one of the right and left actuators is extended while the other is retracted, the two rear wheels may be steered either in the right or left direction. A target toe angle can be calculated for each rear wheel based on a steering angle of the steering wheel of the vehicle and from a vehicle speed of the vehicle. Additionally, while feeding back the output (actual toe position) from each toe-angle sensor (i.e., position sensors), an optimum torque that should be produced from the corresponding actuator can be computed from the deviation of the actual toe angle from a target toe angle, and an electric motor can be controlled so as to produce the optimum torque through a current feedback loop.

In one known rear toe control system, at least one of the toe-angle actuators can be actuated to make the toe angles of the two wheels agree with one another when a fault of the rear toe control system is detected. When one of the wheels has become fixed in position without regard to a control signal supplied to the corresponding actuator, the actuator for the other wheel can be actuated so as to make the toe angles of the two wheels equal to each other. When at least one of the toe-angle sensors is found faulty, the actuators can be both actuated until the actuators reach positions corresponding to limit stoppers. When information for determining target values of the toe angles of the right and left wheels is found faulty, the actuators can be both actuated until the actuators reach positions corresponding to prescribed referenced toe positions. In another known system, the allowed speed for a vehicle is searched via a look-up map under certain failure conditions of the RTC system.

SUMMARY

According to one aspect, a rear toe control method for a vehicle is provided. In the method according to this aspect, a determination is made as to whether a rear toe control (RTC) system on the vehicle has failed. A determination is also made as to whether the vehicle is encountering a poor road surface. A low speed limit is imposed for the vehicle when determined that the RTC system has failed and determined that the vehicle is encountering a poor road surface.

According to another aspect, a rear toe control system for a vehicle includes at least one rear actuator for applying rear steering to rear wheels of the vehicle and at least one rear sensor for measuring individual toe angles of the rear wheels. The system further includes a RTC failure module that determines when the RTC system has failed and a road condition determining module that determines whether the vehicle is encountering a poor road surface condition. An electronic control unit (ECU) is disposed on the vehicle for individually controlling displacements of the at least one rear actuator and is configured to impose a speed limit for the vehicle when the RTC failure module determines that the RTC system has failed and the road condition determining module determines that the vehicle encountering a poor road surface condition.

According to a further aspect, a vehicle control method for handling rear toe control failures is provided. More particularly, in accordance with this aspect, a determination is made as to whether a rear toe control (RTC) failure condition has occurred. A determination is also made as to whether a poor road surface condition is encountered. A speed limit is imposed when determined that the RTC failure condition has occurred and the poor road surface condition is encountered.

DETAILED DESCRIPTION

Figure 1:
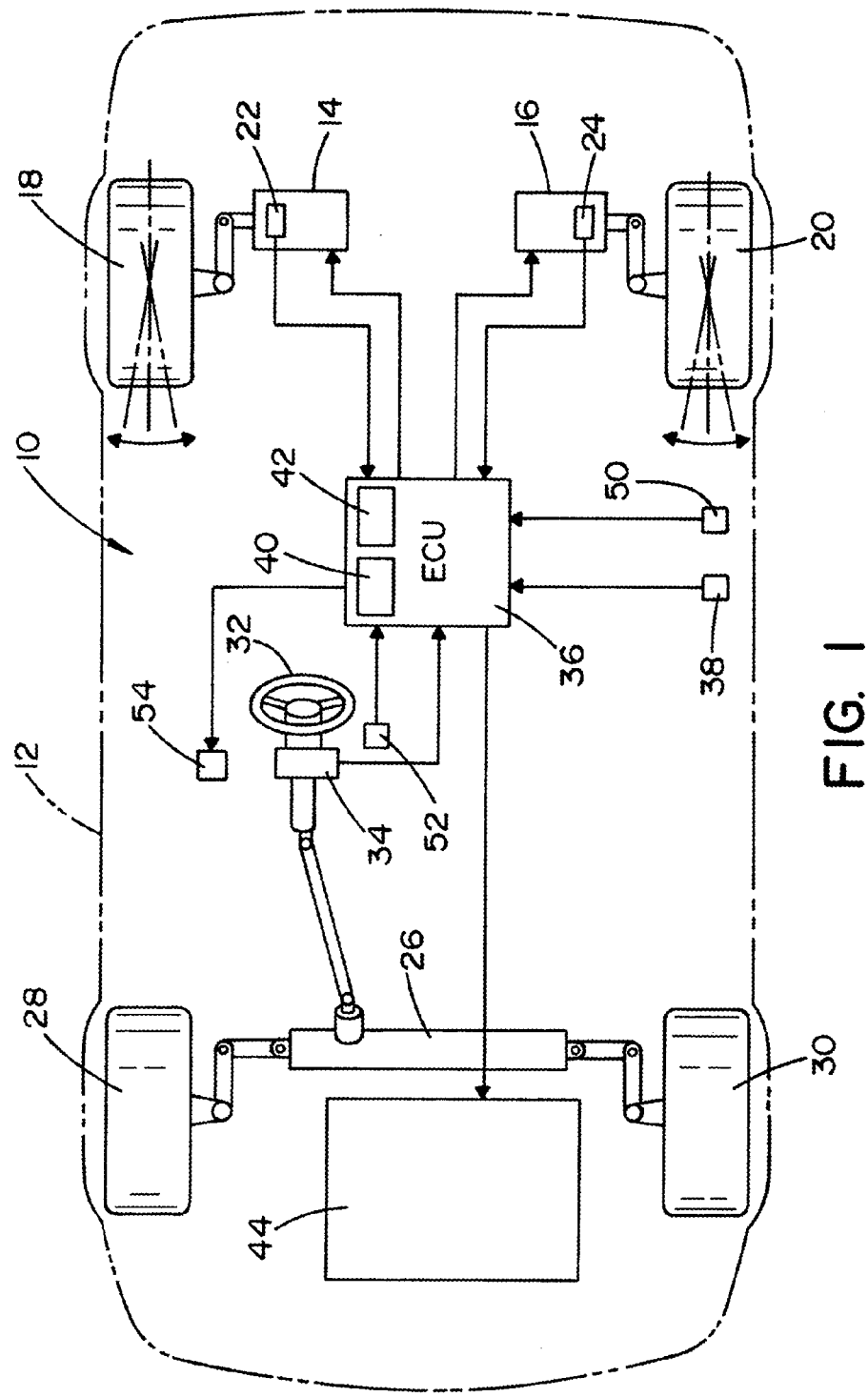
FIG. 1 is a schematic view of a vehicle having a rear toe control system.

Referring now to the drawings, wherein the showings are for purposes of illustrating one or more exemplary embodiments and not for purposes of limiting same, FIG. 1 schematically illustrates a rear toe control (RTC) system 10 for a vehicle 12. The system 10 can include a pair of rear actuators 14, 16 disposed on the vehicle 12 for applying rear steering to rear wheels 18, 20 of the vehicle 12. In particular, and as is known and understood by those skilled in the art, the actuators 14, 16 can individually change the toe angles of the right and left rear wheels 18, 20 by varying the length of parts, such as lateral links, of rear wheel suspension units supporting the right and left rear wheels 18, 20. The system 10 can further include rear sensors 22, 24 for measuring actual individual toe angles of the rear wheels 18, 20.

In addition, the vehicle 12 can include a front wheel steering device 26 for directly steering a right and left front wheel 28, 30 according to a steering angle of a steering wheel 32. A steering angle sensor 34 can be disposed on a vehicle 12 for detecting a steering angle of the steering wheel 32. In one embodiment, the steering angle of the steering wheel 32, as sensed by the steering angle sensor 34, and/or the actual displacement of the rear wheels 18, 20, as sensed by the rear sensors 22, 24, can be used an input in the operation of the rear actuators 14, 16. More particularly, the RTC system 10 can include an electronic control unit (ECU) 36 that is disposed on the vehicle 12 for individually controlling the displacements of the actuators 14, 16 according to the outputs of the various sensors 22, 24, 34. Thus, the ECU 36 can be operatively connected to the sensors 22, 24, 34 for receiving input signals therefrom and to the actuators 14, 16 for sending command signals thereto.

As will be known and understood by those of skill in the art, each of the rear actuators 14, 16 can include a rotary motion/linear motion converter combining an electric motor fitted with a reduction gear and thread mechanism (not shown), a cylinder device that linearly actuates a piston rod by using hydraulic pressure (not shown) or any other suitable actuator. Also, each of the rear sensors 22, 24 can be comprised of a potentiometer or other known displacement sensor, such as an electromagnetic sensor or other non-contact sensor. In normal operation, the ECU 36 can freely control the toe-in and toe-out of the rear wheels 18, 20 by actuating the actuators 14, 16 (e.g., in a symmetric manner). For example, if one of their right and left actuators 14, 16 is extended while the other is retracted, the two rear wheels 18, 20 can be steered either in the right or left direction. In one example, the actuators 14, 16 are generally controlled by the ECU 36 depending upon input from the steering angle sensor 34 and a vehicle speed sensor 38 disposed on the vehicle 12 for measuring a speed thereof. The rear sensors 22, 24 can provide actual position input for the rear wheels 18, 20 to the ECU 36 which can fine-tune the actuators 14, 16 in a feedback loop arrangement for improved rear toe control on the vehicle 12.

The system 10 can additionally include a RTC failure module 40 that determines when the RTC system 10 has failed and a road condition determining module 42 that determines whether the vehicle 12 is encountering a poor road surface condition. In the illustrated embodiment, the RTC failure module 40 and the road condition determining module 42 are incorporated into the ECU 36, though this is not required and other arrangements and/or configurations can be used. The ECU 36 of the illustrated embodiment can also be the engine ECU for the vehicle 12 that controls operation of an internal combustion engine 44 disposed on the vehicle 12 as is known and understood by those skilled in the art. The ECU 36 can be configured to impose a speed limit for the vehicle 12 when the RTC failure module 40 determines that the RTC system 10 has failed and the road condition determining module 42 determines that the vehicle 12 is encountering a poor road surface condition.

In an exemplary embodiment, the speed limit is a low speed limit and the ECU 36 is further configured to impose a high speed limit for the vehicle 12 when the RTC failure module 40 determines that the RTC system 10 has failed and the road condition determining module 42 determines that the vehicle 12 is not encountering a poor road surface condition. In particular, the high speed limit is greater than the low speed limit and can be significantly greater than the low speed limit (e.g., the low speed limit can be 35 KPH and the high speed limit can be 120 KPH). In the same or another exemplary embodiment, the ECU can be further configured to only impose the low speed limit or the high speed limit when the rear sensors 22, 24 indicate that the rear wheels are toe steered and not in parallel.

The system 10 can additionally include an ambient temperature sensor 50 for measuring an ambient temperature outside the vehicle 12 and communicating the measured temperature to the ECU 36. Also, the system 10 can include a brake sensor 52 that indicates when a brake control (not shown) of the vehicle 12 is activated and communicates this to the ECU 36. As will be described in further detail below, input from the temperature sensor 50 and/or the brake sensor 52 can be used by the ECU 36, and particularly by the road condition determining module 42, to determine whether the vehicle 12 is encountering a poor road surface condition (e.g., an icy road).

The system 10 can further include a display 54 operatively connected to the ECU 36. For example, the display 54 can be provided on the dashboard of the vehicle 12 or incorporated into another display element on the dashboard of the vehicle 12 (e.g., a navigational screen or other display device). The ECU 36 can be configured to control the display 54 for displaying a message within the vehicle 12 whenever a speed limit is imposed by the RTC system 10. In one embodiment, the display 54 displays the low speed limit or an indication corresponding to the low speed limit when the low speed limit is imposed and displays the high speed limit or an indication corresponding to the high speed limit when the high speed limit is imposed.

Though not shown, it will be understood and appreciated by those skilled in the art that the ECU 36 can include an input/output interface for sending and receiving signals with the various components of the system 10 and/or the vehicle 12, including the various sensors and components (e.g., sensors 22, 24, 34, 38 and 50, actuators 14, 16, display 54, etc.) described herein. As is known, the input/output interface can include an input circuit having various functions including the function of shaping the wave forms of input signals from the various sensors or other components, a function of correcting the voltage of the input signals to a predetermined level, and a function of converting analog signal values into digital signal values. Also, the input/output interface can include an output circuit for supplying drive signals to the various components of the system 10. In addition, the ECU 36 can include a central processing unit (CPU) linked to the input/output interface and linked to a memory circuit including a ROM, which can store various operational programs to be executed by the CPU (e.g., the modules 40, 42 can be stored in the ROM), and a RAM for temporarily storing the results of computations or the like by the CPU.

Figure 2:
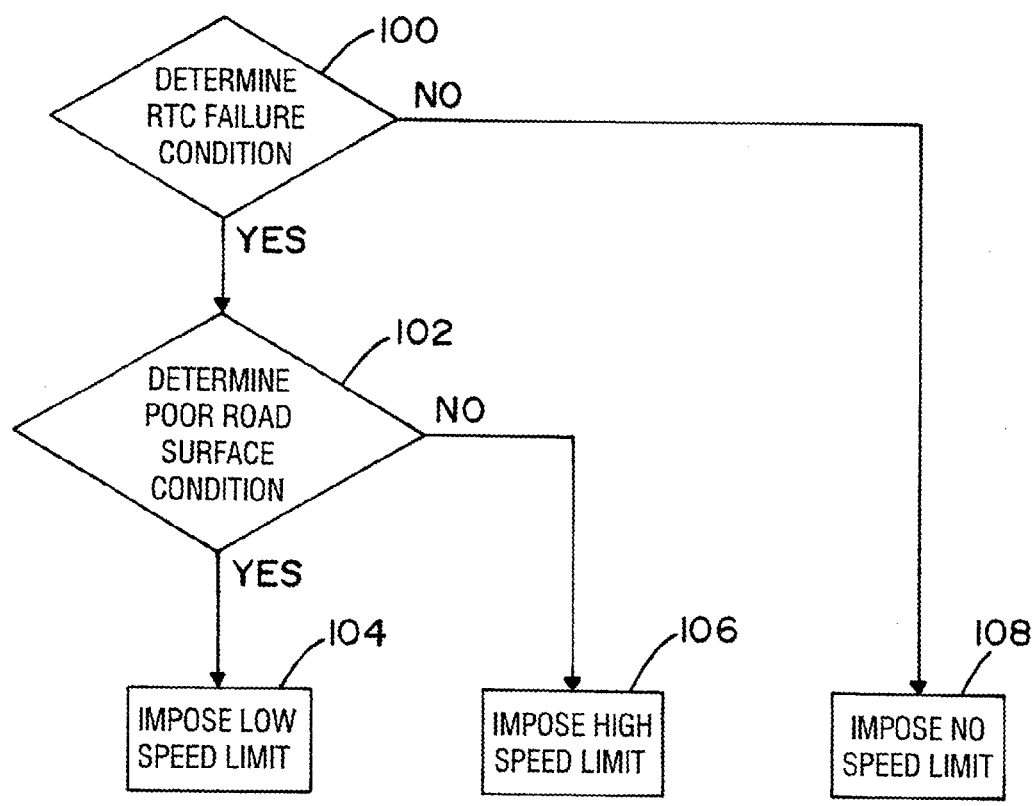
FIG. 2 is a flow chart illustrating a rear toe control method for a vehicle.

With reference to FIG. 2, a rear toe control method for a vehicle is shown according to one exemplary embodiment and may also be referred to as a vehicle control method for handling rear toe control failures. The method of FIG. 2 can be used with the rear toe control system 10 of FIG. 1 and will be described with particular reference thereto, though this is not required and it is to be appreciated that the rear toe control method could be applied to other rear toe control systems. In the method of FIG. 2, a determination is made as to whether a rear toe control (RTC) system 10 on the vehicle 12 has failed at 100. This can include determining whether a RTC failure condition has occurred or is satisfied in the vehicle 12. When determined that the RTC failure condition has occurred in 100, a determination can be made at 102 as to whether the vehicle 12 is encountering a poor road surface. This can include determining whether a poor road surface condition is encountered or occurring (i.e., whether a condition is satisfied that corresponds to a likelihood that the road on which the vehicle 12 is travelling is in a poor condition, such as when the road is icy).

When determined that a poor road surface condition is encountered in 102, a speed limit, and particularly a first or low speed limit, can be imposed for the vehicle 12 at 104. Thus, a low speed limit can be imposed at 104 for the vehicle 12 when determined that the RTC system 10 has failed in 100 and determined that the vehicle 12 is encountering a poor road surface in 102. When the poor road condition is not satisfied in 102, another speed limit, and particularly a second or high speed limit, can be imposed for the vehicle 12 at 106. As described above, the second or high speed limit can be greater than the first or low speed limit. In particular, in an exemplary embodiment, the low speed limit can be somewhere in the range of about 25 to 45 KPH and the high speed limit can be somewhere in the range of about 110 to 130 KPH. In a specific exemplary embodiment, the low speed limit is approximately 35 KPH and the high speed limit is approximately 120 KPH. As shown at 108, no speed limit is imposed on the vehicle 12 in association with the RTC system 10 when no failure of the RTC system 10 has been determined in 100.

Figure 3:
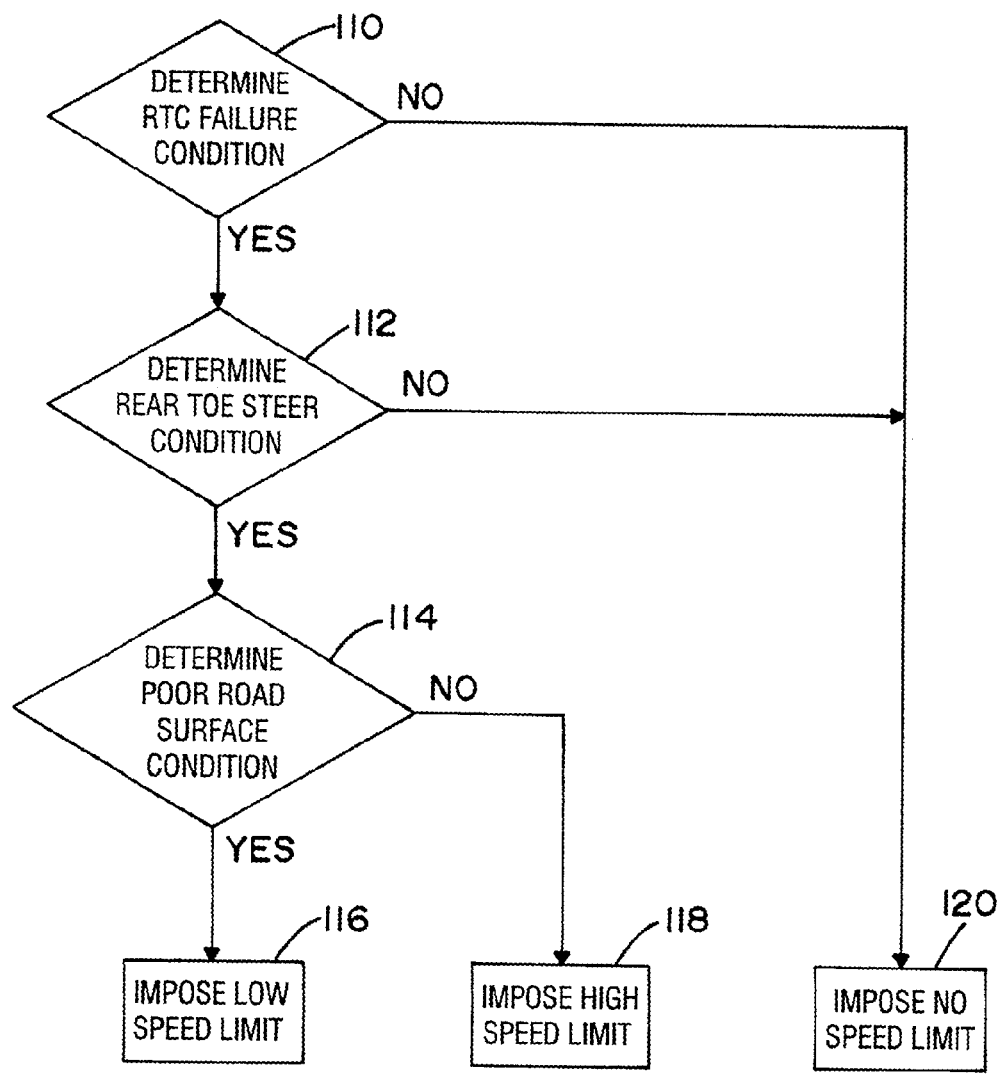
FIG. 3 is a flow chart illustrating another rear toe control method for a vehicle.

With reference to FIG. 3, a rear toe control method for a vehicle is shown according to another exemplary embodiment and may also be referred to as a vehicle control method for handling rear toe control failures. Like the method of FIG. 2, the method of FIG. 3 can be used with the rear toe control method of FIG. 1 and will be described with particular reference thereto, though this is not required and it is to be appreciated that the rear control method of FIG. 3 could be applied to other rear toe control systems. In the method of FIG. 3, a determination is made as to whether a rear toe control (RTC)

system 10 on the vehicle 12 has failed at 110. Like 100, the determination at 110 can include determining whether a RTC failure condition has occurred or is satisfied in the vehicle 12.

When determined that the RTC failure condition has occurred in 110, a determination can be made at 112 as to whether the rear wheels 18, 20 on a vehicle 12 are toe steered. This can include determining whether a rear toe steer condition is occurring or is satisfied for the vehicle 12. When determined that the RTC failure condition has occurred at 110 and determined that the rear toe steer condition occurs at 112, a determination can be made at 114 as to whether the vehicle 12 is encountering a poor road surface. Like 102, the determination at 114 can include determining whether a poor road surface condition is encountered or occurring (i.e., whether a condition is satisfied that corresponds to a likelihood that the road on which the vehicle 12 is travelling is in a poor condition, such as when the road is icy).

When determined that a poor road surface condition is encountered in 114, and thus determinations have been made in 110 that the RTC system 10 has failed and the rear toe steer condition is satisfied in 112, the first or low speed limit described above can be imposed at 116 for the vehicle 12. When the poor road condition is not satisfied in 114, the second or high speed limit described above can be imposed at 118. As shown at 120, no speed limit is imposed on the vehicle 12 in association with the RTC system 10 when no failure of the RTC system 10 has been determined in 110. Likewise, when it is determined that the rear wheels on the vehicle are not toe steered in 112, the method proceeds to 120 such that no speed limit is imposed on the vehicle 12 in association with the RTC system 10. In other words, the determination as to whether a poor road surface condition is encountered in 114 only occurs when determined in 110 that the RTC failure condition is satisfied and determined in 112 that a rear toe condition is occurring.

In an exemplary embodiment, the speed limits imposed at 104, 106, 116 and 118 can be imposed gradually when the vehicle 12 is already above the prescribed speed limit so as to avoid abrupt imposition of the speed limit. In one example, the speed limit can be imposed by using the vehicle's brakes or controlling the engine (e.g., ignition timing, fuel cut and/or throttle) to reduce the speed of the vehicle 12.

By way of example, in both the methods of FIG. 2 and FIG. 3, the determinations in 100 and 110 as to whether a RTC system 10 on the vehicle 12 has failed can include determining that the RTC system 10 has stopped network communication. For example, in one embodiment, the ECU 36 is operatively linked for communication with the actuators 14, 16, the rear sensors 22, 24, and the steering angle sensor 34 on a vehicle network (e.g., a vehicle CAN) and the RTC system 10 can be determined to have failed due to one or more of the ECU 36, the actuators 14, 16, the rear sensors 22, 24 and the steering angle sensor 34 ceasing to communicate over the vehicle network. When a failure condition occurs, the RTC system 10 can via the ECU 36 send a fail status to or over the vehicle network. Other components operatively linked by the vehicle network can include, for example, the powertrain control unit, brake control, meter, etc. (none of which are shown).

The determination in 112 can include one or more of detecting that the rear wheels 18, 20 are not parallel and detecting that one or both the rear sensors 22, 24 has failed. In an exemplary embodiment, the rear toe condition is determined to be occurring at 112 (i.e., is satisfied) when any one of the following occurs: the rear wheels 18, 20 are detected as not being parallel and/or one or both of the rear sensors 22, 24 has been detected as failed. Examples of when the rear wheels 18, 20 would not be parallel are when the rear wheels 18, 20 are either in a toe-in state or a toe-out state. In particular, when the right and left rear wheels 18, 20 are parallel, the speed of the vehicle 12 has been found not to be relevant to the countersteer needed to be applied to correct the direction of the vehicle.

The determinations in 102 and 114 that the vehicle 12 is encountering a poor road surface condition (i.e., the poor road surface condition is satisfied) can include determining whether an actual road condition encountered by the vehicle 12 is likely to be in a slippery condition (i.e., the road surface is icy and/or otherwise has a low coefficient of friction). Determining whether an actual road condition is likely to be in a slippery condition can include one or both of: determining whether a brake control of the vehicle is activated via sensor 52 and determining whether the ambient temperature as measured by the sensor 50 on the vehicle 12 is below a predetermined threshold (e.g., below zero degrees Celsius).

In one example, the predetermined temperature threshold can be about 2.8° Celsius. In an exemplary embodiment, determining whether an actual road condition is likely to be in a slippery condition includes both determining whether the brake control of the vehicle 12 is activated via brake sensor 52 and determining whether the ambient temperature as measured by the temperature sensor 50 is below a predetermined temperature threshold. If either of these conditions occurs, the ECU 36 via the road condition determining module 42 can determine that a poor road surface condition is occurring (or is satisfied) and therefore can proceed to 104 in FIG. 2, or can proceed to 116 in FIG. 3, and impose the low speed limit on the vehicle 12. In contrast to vehicle speed being found not be relevant to the countersteer needed when the rear wheels 18, 20 are parallel, icy road conditions have been found to require significant countersteer when the rear wheels 18, 20 are in a toe-in and a toe-out condition.

Optionally, a message can be displayed on the display 54 inside the vehicle 12 whenever a speed limit is imposed (e.g., at 104 and 106 in FIG. 2 and at 116 and 118 in FIG. 3). More generally, an indication can be provided to the driver of the vehicle 12 (e.g., visual and/or audio) when either the low speed limit is imposed or the high speed limit is imposed in either FIG. 2 or FIG. 3. In one example, the display 54 is used and a message is displayed within the vehicle 12 on the display 54 indicating that the low speed limit is imposed at 104 or 116 or the high speed limit is imposed at 106 or 118. In particular, the message can include an indication as to which of the low speed limit or the high speed limit is imposed.

It is to be appreciated that in connection with the particular exemplary embodiments presented herein certain structural and/or functional features are described as being incorporated in defined elements and/or components. However, it is contemplated that these features may, to the same or similar benefit, also likewise be incorporated in common elements and/or components, or separated, where appropriate. For example, the ECU 36 could be distributed throughout the system 10. It is also to be appreciated that different aspects of the exemplary embodiments may be selectively employed as appropriate to achieve other alternative embodiments suited for desired applications, the other alternate embodiments thereby realizing the respective advantages of the aspects incorporated herein.

It is also to be appreciated that particular elements or components described herein may have their functionality suitably implemented via hardware, software, firmware, or in combination thereof. Additionally, it is to be appreciated that certain elements described herein as incorporated together may under suitable circumstances be stand-alone elements or otherwise divided. Similarly, a plurality of particular functions described as being carried out by one particularly element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

It will be further appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A rear toe control method for a vehicle, comprising:
    determining with an ECU whether a rear toe control (RTC) system on the vehicle has failed by determining if at least one of: one or more ECU units, actuators, or sensors cease to communicate or operate;
    determining with an ECU whether the vehicle is encountering a poor road surface by determining if at least one of: one or more brake sensors sense that a brake control of the vehicle is activated or one or more ambient temperature sensors sense that an outside ambient temperature is below a predetermined temperature threshold; and
    imposing with the ECU a low speed limit for the vehicle wherein the ECU controls brakes of the vehicle or controls operation of an engine of the vehicle to reduce the speed of the vehicle when determined that the RTC system has failed and determined that the vehicle is encountering a poor road surface.

2. The rear toe control method of claim 1 further including:
    imposing with the ECU a high speed limit wherein the ECU controls the brakes of the vehicle or controls operation of the engine of the vehicle to reduce the speed of the vehicle when determined that the RTC system has failed and determined that the vehicle is not encountering a poor road surface, wherein the high speed limit is greater than the low speed limit.

3. The rear toe control method of claim 2 wherein no speed limit is imposed on the vehicle with the ECU in association with the RTC system when no failure of the RTC system has been determined.

4. The rear toe control method of claim 2 further including:
    determining with the ECU whether rear wheels on the vehicle are toe steered when determined that the RTC system has failed, and
    wherein the low speed limit is only imposed when determined that the rear wheels are toe steered, and further wherein no speed limit is imposed on the vehicle in association with the RTC system when no failure of the RTC system has been determined.

5. The rear toe control method of claim 4 wherein said determining whether the rear wheels are toe steered including one or more of:
    detecting that the rear wheels are not parallel; and
    detecting that at least one rear sensor for the rear wheels has failed.

6. The rear toe control method of claim 1 wherein determining that the RTC system has failed includes determining that the RTC system has stopped network communication.

7. The rear toe control method of claim 1 wherein determining that the vehicle is encountering a poor road surface includes determining whether an actual road condition is likely to be in a slippery condition.

8. The rear toe control method of claim 7 wherein determining whether an actual road condition is likely to be in a slippery condition includes at least one of:
    determining whether a brake control of the vehicle is activated; and
    determining whether ambient temperature as measured by a sensor on the vehicle is below a predetermined temperature threshold.

9. The rear toe control method of claim 7 wherein determining whether an actual road condition is likely to be in a slippery condition includes both:
    determining whether a brake control of the vehicle is activated; and
    determining whether ambient temperature as measured by a sensor on the vehicle is below a predetermined temperature threshold.

10. The rear toe control method of claim 2 wherein the low speed limit is approximately 35 kph and the high speed limit is approximately 120 kph.

11. The rear toe control method of claim 2 further including:
    providing an indication to a driver of the vehicle when either the low speed limit or the high speed limit is imposed.

12. The rear toe control method of claim 11 wherein said providing an indication includes:
    displaying a message within the vehicle indicating that the low speed limit or the high speed limit is imposed, said message including an indication as to which of the low speed limit and the high speed limit is imposed.

13. A rear toe control (RTC) system for a vehicle, comprising:
    at least one actuator for applying rear steering to rear wheels of the vehicle and at least one rear sensor for measuring individual toe angles of the rear wheels;
    a RTC failure module that determines when the RTC system has failed;
    a road condition determining module that determines whether the vehicle is encountering a poor road surface condition; and
    an electronic control unit (ECU) disposed on the vehicle for individually controlling displacements of the at least one rear actuator and configured to impose a speed limit for the vehicle by controlling brakes of the vehicle or controlling operation of an engine of the vehicle to reduce the speed of the vehicle when the RTC failure module determines that the RTC system has failed and the road condition determining module determines that the vehicle is encountering a poor road surface condition.

14. The rear toe control system of claim 13 wherein the speed limit is a low speed limit and the ECU is further configured to impose a high speed limit for the vehicle when the RTC failure module determines that the RTC system has failed and the road condition determining module determines that the vehicle is not encountering a poor road surface condition, wherein the high speed limit is greater than the low speed limit.

15. The rear toe control system of claim 13 wherein the RTC failure module and the road condition determining module are incorporated into the ECU.

16. The rear toe control system of claim 14 wherein the RTC failure module and the road condition determining module are incorporated into the ECU, and the ECU is further configured to only impose the low speed limit or the high speed limit when at least one rear sensor indicates that the rear wheels are toe steered and not in parallel.

17. The rear toe control system of claim 13 further including:
   a display operatively connected to the ECU, wherein the ECU is configured to control the display for displaying a message within the vehicle when speed limit is imposed.

18. A vehicle control method for handling rear toe control failures for a vehicle, comprising:
   determining with an ECU whether a rear toe control (RTC) condition has occurred by determining if at least one of: one or more ECU units, actuators, or sensors cease to communicate or operate;
   determining with the ECU whether poor road surface condition is encountered by determining if at least one of: one or more brake sensors sense that a brake control of the vehicle is activated or one or more ambient temperature sensors sense that an outside ambient temperature is below a predetermined temperature threshold; and
   imposing with the ECU a speed limit wherein the ECU controls brakes of the vehicle or controls operation of an engine of the vehicle to reduce the speed of the vehicle when determined that the RTC failure condition has occurred and the poor road surface condition is encountered.

19. The vehicle control method of claim 18 further including:
   determining with the ECU whether a rear toe condition is occurring by detecting one or more of: the rear wheels are not parallel, at least one rear sensor for the rear wheels has failed, wherein said determining whether a poor road surface condition is encountered only occurs when determined that a rear toe condition is occurring; and
   imposing with the ECU a second, high speed limit for the vehicle when determined that the RTC failure condition has occurred and no poor road surface condition is encountered.

20. The vehicle control method of claim 18 further including:
   providing a message inside the vehicle when the speed limit is imposed.

* * * * *